United States Patent Office 2,883,442

Patented Apr. 21, 1959

2,883,442

PROCESS FOR VULCANIZING RUBBER IN THE PRESENCE OF THE CYCLOHEXYLAMINE SALT OF MERCAPTOBENZTHIAZOLE

Gordon Stansfield Mills, Romiley, Stockport, England, assignor to Monsanto Chemicals Limited, London, England, a British company No Drawing. Application December 14, 1954 Serial No. 475,305

Claims priority, application Great Britain December 31, 1953

3 Claims. (Cl. 260—788)

This invention relates to rubber vulcanisation accelerators of enhanced activity suitable for use at low temperatures, such as room temperature or slightly above, and to their use in the vulcanisation of rubber.

Most rubber vulcanisation processes are carried out at temperatures above 100° C. and the vulcanisation accelerators employed in them are usually not capable of effecting vulcanisation at lower temperatures within a reasonable period of time. This inactivity at lower temperatures is in fact normally a very desirable characteristic, for it enables preliminary processing of rubber stock to be carried out without premature vulcanisation. There are, however, processes in which it is desirable or convenient to vulcanise rubber at relatively low temperatures and which therefore require the use of vulcanisation accelerators which promote vulcanisation at these temperatures. The present invention is concerned with rubber vulcanisation accelerators of this latter kind, of which up to the present comparatively few are known.

We have found that when a mixture of an amine salt of mercaptobenzthiazole (that is, 2-mercaptobenzthiazole) and a zinc salt of an N:N-dialkyldithiocarbamic acid is used as a rubber vulcanisation accelerator, it is possible to vulcanise rubber satisfactorily at low temperatures, even at temperatures in the region of 20° to 25° C. This is surprising in view of the fact that when either the amine salt of mercaptobenzthiazole or the zinc salt of an N:N-dialkyldithiocarbamic acid is used alone, it is apparently not possible to vulcanise rubber at room temperature.

The new rubber vulcanisation accelerators of the invention are therefore mixtures of an amine salt of mercaptobenzthiazole and a zinc salt of an N:N-dialkyldithiocarbamic acid.

The amine salt of mercaptobenzthiazole used is preferably one derived from an aliphatic or cycloaliphatic amine, and the zinc salt of an N:N-dialkyldithiocarbamic acid is preferably one in which the alkyl groups contain from one to four carbon atoms. Very satisfactory results have been obtained using a mixture of the cyclohexylamine salt of mercaptobenzthiazole and the zinc salt of N:N-diethyldithiocarbamic acid (more shortly known as zinc diethyldithiocarbamate).

The amine salt of mercaptobenzthiazole and the zinc salt of an N:N-dialkyldithiocarbamic acid can be employed in proportions varying between wide limits, for example, from 30:70 to 90:10 parts by weight respectively and particularly good results can be obtained by using the components in the proportions from 50:50 to 80:20 by weight respectively. Where the accelerator consists of a mixture of the cyclohexylamine salt of mercaptobenzthiazole and zinc diethyldithiocarbamate, it has been found very suitable to use these components in the proportion 75:25 by weight respectively.

The proportion of the accelerator used in a rubber composition can also be varied considerably. In practice it can be used in any amount above about 0.2 part by weight per 100 parts of rubber, and a particularly effective amount is from 2 to 5 parts by weight per 100 parts of rubber. When using a mixture of the cyclohexylamine salt of mercaptobenzthiazole and zinc diethyldithiocarbamate in the proportion 75:25 by weight respectively, it has been found very suitable to use it in the amount of about 3.5 parts by weight per 100 parts of rubber.

The accelerators of this invention may be added to the rubber stock in the form of a mixture of the two components or the components may, if desired, be added separately. Moreover, the amine salt of mercaptobenzthiazole may be incorporated as such in the rubber composition to be vulcanised, or alternatively, as the amine and mercaptobenzthiazole separately. In the latter instance the amine and mercaptobenzthiazole appear to play the same part as a salt obtained from them. However, as the aliphatic and cycloaliphatic amine salts of mercaptobenzthiazole are usually solids, whereas the amines themselves are often liquids, it will normally be found more convenient to use the amine salts of mercaptobenzthiazole directly, rather than to add the amine and mercaptobenzthiazole separately. The vulcanisation of rubber using the vulcanisation accelerators formed in situ by incorporating the separate components or substances as indicated above, is of course to be regarded as within the scope of the invention.

While the accelerators of this invention are suitable for use in rubber stocks at room temperature, they may, if desired, be used at higher temperatures, for instance at temperatures up to 100° C., when, of course, they will be even more active in accelerating vulcanisation, and in such an instance the accelerator will, of course, need to be incorporated in the rubber composition at a temperature below that at which it initiates too rapid a vulcanisation for the necessary processing to be carried out. Preferably, however, the accelerators are used at temperatures between 15° and 50° C. The incorporation of the accelerators of this invention in rubber is preferably achieved by making a masterbatch containing the rubber and all the compounding ingredients to be used except sulphur and the accelerator, dividing the masterbatch into two equal portions, to one of which is added the sulphur and to the other the accelerator and, finally, mixing the two portions at as low a temperature as is practicable.

The accelerators of this invention are suitable for use with either natural or synthetic rubber. They are also suitable for employment in processes in which the rubber is used in the form of a solution, dispersion or latex, instead of the solid form, especially as the incorporation of the vulcanisation accelerator is then particularly easy and can be effected without any appreciable rise in temperature which might cause premature vulcanisation.

The invention is illustrated by the following examples.

*Example 1*

This example describes the use at 22° C. of an accelerator consistng of a mixture of 75 parts by weight of the cyclohexylamine salt of mercaptobenzthiazole and 25 parts by weight of zinc diethyldithiocarbamate.

A rubber stock was prepared from the following ingredients:

| | Parts by weight |
|---|---|
| Pale crepe | 100.0 |
| Blanc fixe | 50.0 |
| Zinc oxide | 5.0 |
| Sulphur | 2.5 |
| Stearic acid | 1.0 |
| Accelerator | 3.5 |

The rubber stock was first compounded into a masterbatch by mixing the pale crepe, blanc fixe, zinc oxide and stearic acid on the rolls of a laboratory mill at 70° C. The compounded masterbatch, after allowing to cool, was divided into two equal parts, to one of which was added the sulphur and to the other, the accelerator. The two portions of the stock were blended on a mill, the rolls of which were maintained at 20° C., "sheeted," that is, formed into a sheet 1 mm. thick and stored at 22° C. For the sheeting operation, the blended rubber compositoin was passed once through the rolls of a mill maintained at 65° C. This temperature was chosen as being the lowest practical temperature at which a sheet of uniform thickness and homogeneous composition could be obtained by a single passage through the rolls of the mill. A very little vulcanisation, of course, occurred during the sheeting, but the major part of the vulcanisation took place during the subsequent storage of the sheeted material at 22° C.

The rate of vulcanisation of the compounded material was observed by measuring the extent of vulcanisation after intervals of 1, 2, 3, 4 and 5 days from the time of final compounding of the stock. The state of vulcanisation was measured by the linear swelling method as described in part 4 of British standard specification No. 1,673 of 1953.

This method is based upon the fact that unvulcanised rubber readily swells and dissolves when it comes into contact with benzene, whereas vulcanised rubber is affected to a smaller extent, and the amount of swelling produced can be used as a measure of the extent of vulcanisation.

A sample 100 mm. long by 1 mm. wide was cut from the prepared rubber sheet and transferred rapidly to a narrow glass tube (having in this instance an internal diameter of 6 mm.) containing sufficient benzene to immerse the sample. The tube containing the sample was then held at an angle of 30° to the horizontal at room temperature (about 22° C.).

After periods of 1 hour and 24 hours from the time of immersion the length of the rubber sample was measured; the increase in length due to swelling provided a measure of the amount of vulcanisation undergone by the rubber stock from which the sample had been taken.

In the table of results given below, the left hand column shows the period for which the sheeted material was stored before the sample was removed, that is, the period for which vulcanisation had been proceeding. The other two columns show the length (in millimetres) of the rubber sample after immersion in benzene for periods of 1 and 24 hours. It will be observed that the amount of swelling of the rubber sample decreases with increased storage time, that is, with increased time of vulcanisation or cure. The results clearly indicate that vulcanisation at room temperature is effected using the accelerator.

| Time of Cure | Length of test piece after benzene treatment | |
|---|---|---|
| | After 1 hour | After 24 hours |
| 1 day | Sample dissolved | Sample dissolved. |
| 2 days | 189 mm. | 208 mm. |
| 3 days | 171 mm. | 185 mm. |
| 4 days | 167 mm. | 185 mm. |
| 5 days | 165 mm. | 177 mm. |

*Example 2*

This example illustrates the use of the accelerator of Example 1 at 40° C.

A rubber stock was compounded exactly as described in Example 1 except that after being sheeted it was stored at a temperature of 40° C. instead of 22° C. as in the previous example. The sheeted material was tested by the same method as described in Example 1.

The results obtained are given in the following table, and show clearly that vulcanisation has taken place at 40° C.

| Time of Cure | Length of test piece after benzene treatment | |
|---|---|---|
| | After 1 hour | After 24 hours |
| 5 hours | Sample dissolved | Sample dissolved. |
| 10 hours | 170 mm. | 177 mm. |
| 15 hours | 166 mm. | 180 mm. |
| 20 hours | 164 mm. | 178 mm. |

What is claimed is:

1. A process for vulcanizing rubber which comprises blending a vulcanization accelerator comprising a mixture of about 30:70 to about 90:10 parts by weight, respectively, of a cyclohexyl amine salt of mercaptobenzthiazole and a zinc salt of an N:N-dialkyldithiocarbamic acid in which each alkyl group contains from 1–4 carbon atoms with a natural rubber composition.

2. The process of claim 1 wherein the vulcanization accelerator is used in a proportion of from 2 to 5 parts by weight per 100 parts of rubber.

3. The process of claim 1 wherein the blending is performed at a temperature of from 15° to 50° C.

References Cited in the file of this patent

UNITED STATES PATENTS

| | | |
|---|---|---|
| 2,022,953 | Coleman | Dec. 3, 1935 |
| 2,024,605 | Sebrell | Dec. 17, 1935 |
| 2,222,355 | Merrill | Nov. 19, 1940 |
| 2,283,336 | Neal | May 19, 1942 |